UNITED STATES PATENT OFFICE.

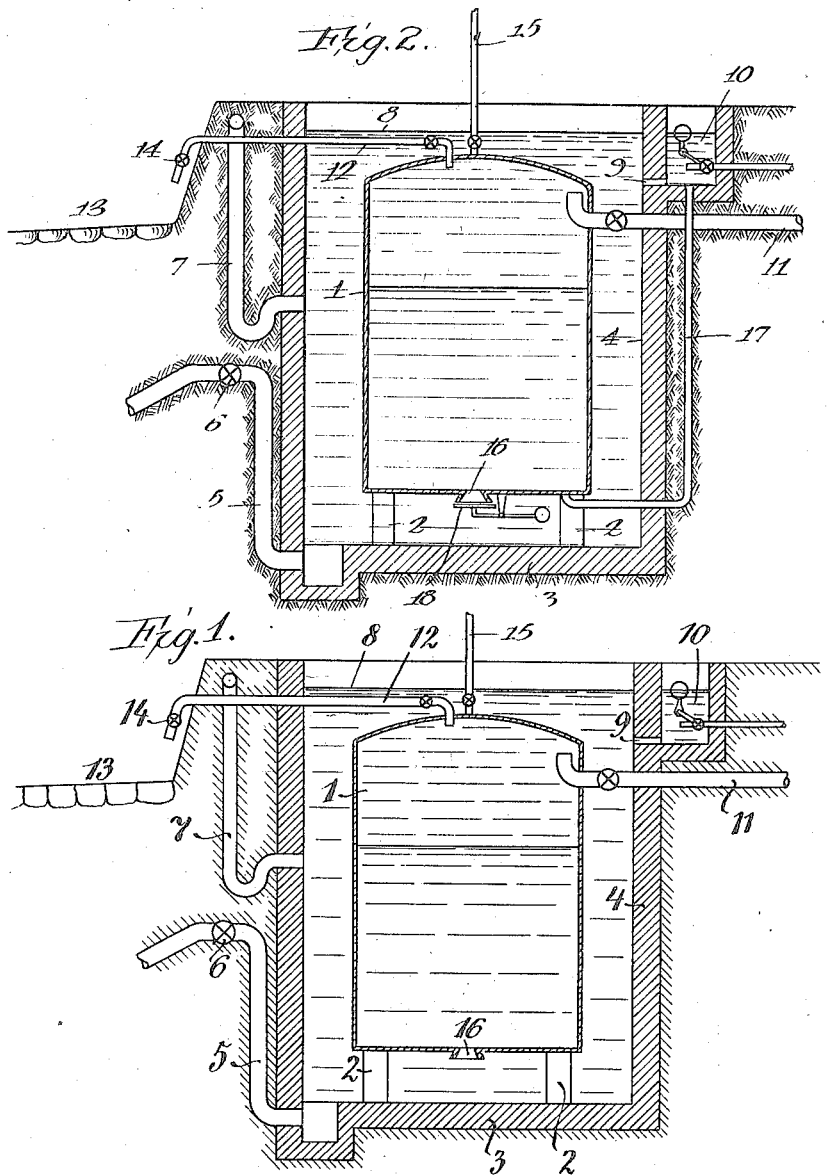

HANS CHRISTIAN ERIK BRUUN, OF COPENHAGEN, DENMARK.

STORAGE PLANT FOR INFLAMMABLE FLUIDS.

1,184,620.          Specification of Letters Patent.          Patented May 23, 1916.

Application filed January 19, 1912. Serial No. 672,194.

*To all whom it may concern:*

Be it known that I, HANS CHRISTIAN ERIK BRUUN, subject of the King of Denmark, residing at Copenhagen, Oster Farmingsgade 93, Denmark, have invented new and useful Improvements in Storage Plants for Inflammable Fluids, of which the following is a specification.

The present invention relates to storage plants for inflammable liquids which do not mix with water and it has for its object to avoid the danger of fire by the tank being, in the first place, completely immersed in a basin filled with water, and by it being, in the second place, permanently kept full, so that the possibility of an accumulation of inflammable gases in the tank is precluded.

A further distinguishing feature of the plant is that the discharge from the tank may be effected without the use of a pump or the like, *i. e.* merely in consequence of the constant water-pressure acting in the tank, as the water level in the tank is constantly kept at a certain definite level by means of a suitable self-acting water supplying device.

Another distinguishing feature of this plant is that the tank may be kept full, without the use of pressure pumps, or the like, inserted in the supply pipe.

On the accompanying drawing, Figure 1 is shown in vertical section a storage plant embodying the invention and designed for storing fluids lighter than water; and Fig. 2 a modified form of the storage tank.

The tank 1 with feet 2 rests on the bottom 3 of the basin or pit whose walls are marked 4 and which is open at top. The pit is fitted, at bottom, with an outlet 5 having a closing device 6, which by means of a suitable gear (not shown on the drawing) may be worked from above, and with an overflow 7, preventing the water from rising above the normal level 8. The clear opening of this overflow-pipe must be at least equal to that of the supply-pipe 11. Besides, the pit is fitted with a supply-pipe 9 from a small basin 10, whose water-level may be maintained constant, for instance by the admission of pressure water through an ordinary ball-cock which in the usual manner may be entirely closed by hand. This closing by hand would, for instance, be necessary when the tank 1 is going to be filled with the inflammable fluid.

Just below the roof of the tank 1 ends the supply-pipe 11, fitted with a closing device. With its open end projecting slightly below the highest point of the roof is a discharge-pipe 12, equally fitted with a closing device said pipe 12 leading down to a discharge-pit 13, and having its outlet 14 located at a certain depth below the water surface 8 in the basin. The inlet of the discharge-tube 12 extends, as illustrated in the drawing, somewhat below the highest point of the tank, in order to prevent air or gases from entering from the top of the tank into the discharge-pipe.

The bottom of the tank is fitted with an opening 16, so that the interior of the tank is in permanent connection with the basin surrounding same. This opening must be at least as large as the clear width of the supply-pipe 11.

When the tank is emptied, *i. e.* its contents drawn out through the discharge-pipe, the water will have penetrated from the basin into the tank through the opening 16, and will have filled it completely, as well as the pipe 15 up to the level of the water in the basin. When fresh inflammable fluid is to be fed in by way of the supply-pipe 11, the water now contained in the tank will assist in drawing in the inflammable fluid. This is accomplished by first closing by hand the ball cock at 10, and the valve in pipe 15, and then opening the valves on pipes 5 and 11 so that the inflammable fluid will enter from pipe 11 while the water is drawn out through the opening 16 and through the discharge-pipes 7 and 5 until the tank is filled while the water level 8 is falling, whereupon the valves on pipes 5 and 11 are again closed and those at 10 and 15 again opened. Hereafter the discharge may again be effected by opening the closing device in the pipe 12, as the contents of the tank will then flow away through the said pipe, on account of the pressure acting in the tank from the surrounding water, which will again have risen to level 8. As the specific gravity of the fluid is less than that of the water, the surface of the fluid, when the tank is entirely filled, will rise in pipe 15 to a level higher than that of the water in the basin by an amount corresponding to the difference in specific gravity, and during the discharge of the fluid its surface will always remain at a higher level than that of the water in the basin until the whole amount of inflammable fluid has been discharged. At this time, the water will stand within the pipe at the same height as in the pit, that means at level 8.

The arrangement described may be modified so that the opening 16 does not constantly connect the tank with the basin, but is fitted with a closing device automatically opening outwardly and serving only to remove the water from the tank, while this is being filled by fluid. In this case, there must be provided a special supply-pipe for the water which has to enter the tank when fluid is discharged and said pipe may suitably originate from the basin 10 and be fitted with a check-valve not shown. Hereby it is attained that the water delivered into the tank is always fresh sludge from the bottom of the tank not being able to find its way into the tank, during the discharge and the suction caused thereby. This modification is illustrated in Fig. 2, where 17 is the pipe connecting basin 10 and tank 1 while 18 is the valve closing outlet 16 and opening outward.

The fluid may be supplied into the tank without the use of a pump, as by opening the valve 6 and closing the valve in the vent 15, the fluid will be drawn in by suction through the pipe 11. Even without the last named valve being closed, the fluid may be supplied in this manner into the tank, although in this case no suction will take place. These circumstances are mainly important when discharging from tank cars and especially from tank ships. From the cars or the ships the fluid may be drawn, without the use of a pump, even when the fluid surface of the tank is below the level of the basin. Hereby are avoided the danger of fire and the danger of electricity produced by friction which are always present where a mechanically driven pump is used on board the tank car or the tank ship.

Another advantage gained is that the supply pipe 11 may eventually be emptied completely of the inflammable fluid, contained therein, so that the danger of fire is also removed from this pipe. In order to attain this, it is only necessary, at last, to supply water to the free end of the pipe (in the tank car or the tank ship) so that it will fill itself with water which then pushes the inflammable fluid ahead and down into the tank 1. The valve at the lower end of pipe 15 is, of course, kept open under ordinary circumstances and is only closed in the case that the inflammable vapors escaping through pipe 15 catch fire at the outlet of said pipe. When the valve in the pipe is then closed, the fire will stop as soon as it reaches down to said valve.

The valves on the pipes 11, 12 and 15, may be placed below the water, as it is difficult to make the valves tight against benzin, petroleum and similar fluids. The entire supply pipe 11 may advantageously be arranged so that it is surrounded by water, at least as long as the fluid is drawn through it into the tank 1. Hereby it is attained that any infiltration of air, at leaking points, is avoided, and thus the formation of explosive gases, due to such leakage, is prevented.

Having now particularly described and ascertained the nature of my said invention and in what manner the same is to be performed, I declare that what I claim is:—

A tank for inflammable fluids constructed with an upwardly tapering roof, and provided with an opening at its bottom, said tank having a supply pipe and a discharge pipe, each provided with suitable valves for the inflammable fluid, said discharge pipe opening into the tank below its highest point, a water filled vessel in which the tank is submerged communicating with the interior of the tank through said bottom opening and means for draining and for maintaining the water at a constant level in the vessel; a narrow upwardly extending pipe from the highest point of the roof of the tank and a valve for said narrow pipe, whereby the surface of the inflammable fluid will rise in said narrow pipe, when its valve stands open, to a level above that of the surrounding water, said tapering roof and narrow pipe thus collecting all air and gas present in the tank and leading them out therefrom.

The foregoing specification signed at Copenhagen this 6th day of January, 1912.

HANS CHRISTIAN ERIK BRUUN.

In presence of two witnesses:
 JULIUS LEHMANN,
 HERMAN REE.